(12) United States Patent
Mansell et al.

(10) Patent No.: US 11,511,490 B2
(45) Date of Patent: Nov. 29, 2022

(54) CHANGING THE GAS CONTENT OF A DEVICE

(71) Applicant: HEWLETT-PACKARD DEVELOPMENT COMPANY, L.P., Spring, TX (US)

(72) Inventors: Rhys Mansell, Sant Cugat del Valles (ES); Pablo Antonio Murciego Rodriguez, Sant Cugat del Valles (ES); Ignacio Alejandre Fernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,860

(22) PCT Filed: Mar. 14, 2018

(86) PCT No.: PCT/US2018/022336
§ 371 (c)(1),
(2) Date: Oct. 24, 2019

(87) PCT Pub. No.: WO2019/177601
PCT Pub. Date: Sep. 19, 2019

(65) Prior Publication Data
US 2020/0398491 A1    Dec. 24, 2020

(51) Int. Cl.
*B29C 64/371*    (2017.01)
*B29C 64/25*    (2017.01)
(Continued)

(52) U.S. Cl.
CPC ............ *B29C 64/371* (2017.08); *B22F 12/00* (2021.01); *B29C 64/25* (2017.08); *B22F 10/10* (2021.01); *B33Y 30/00* (2014.12); *B33Y 40/00* (2014.12)

(58) Field of Classification Search
None
See application file for complete search history.

(56) References Cited

U.S. PATENT DOCUMENTS

| | | |
|---|---|---|
| 4,824,732 A | 4/1989 | Hendry et al. |
| 2011/0113924 A1 | 5/2011 | Asbeck et al. |
| | (Continued) | |

FOREIGN PATENT DOCUMENTS

| | | |
|---|---|---|
| CN | 105345000 | 2/2016 |
| CN | 106041082 | 10/2016 |
| | (Continued) | |

OTHER PUBLICATIONS

Yang et al, CN 106041082, English Translation from WIPO (Year: 2016).*

*Primary Examiner* — Colin W. Slifka
(74) *Attorney, Agent, or Firm* — HP Inc. Patent Department

(57) ABSTRACT

A method of changing the gas content of a device (100) which comprises a first chamber (110). The method comprises: arranging the device in a first configuration, wherein the first chamber has a first internal volume; providing a flow of a first gas to the first chamber so that the gas content of the first chamber is at least partially changed; transitioning the device from the first configuration to a second configuration, wherein the first chamber has a second internal volume which is grater than the first internal volume.

12 Claims, 6 Drawing Sheets

(51) Int. Cl.
*B22F 12/00* (2021.01)
*B33Y 30/00* (2015.01)
*B33Y 40/00* (2020.01)
*B22F 10/10* (2021.01)

(56) References Cited

U.S. PATENT DOCUMENTS

| | | |
|---|---|---|
| 2014/0263209 A1 | 9/2014 | Burris et al. |
| 2017/0106603 A1 | 4/2017 | Pobihun |
| 2018/0001556 A1 | 1/2018 | Buller et al. |

FOREIGN PATENT DOCUMENTS

| | | |
|---|---|---|
| CN | 205614054 U | 10/2016 |
| CN | 206662271 U | 11/2017 |
| GB | 2543305 | 4/2017 |
| GB | 2543305 A | 4/2017 |
| JP | 2010132961 | 6/2010 |

* cited by examiner

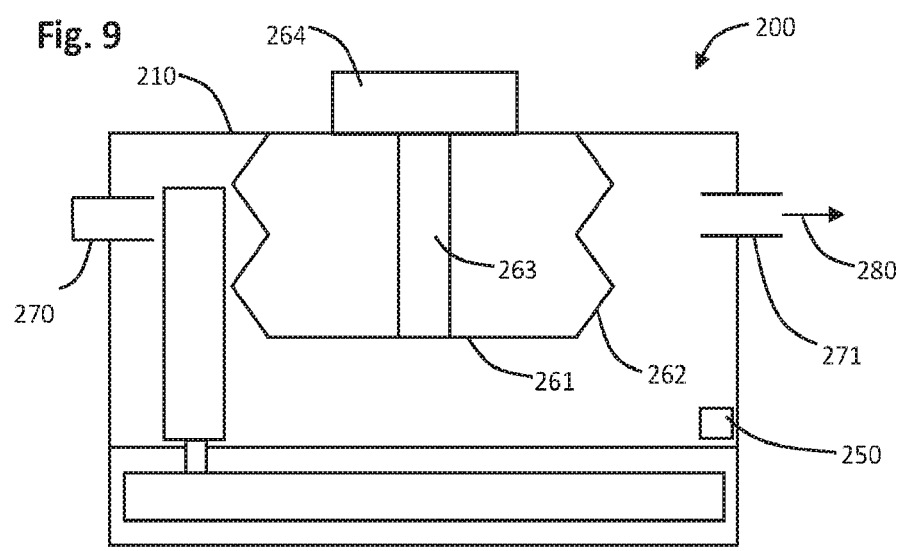
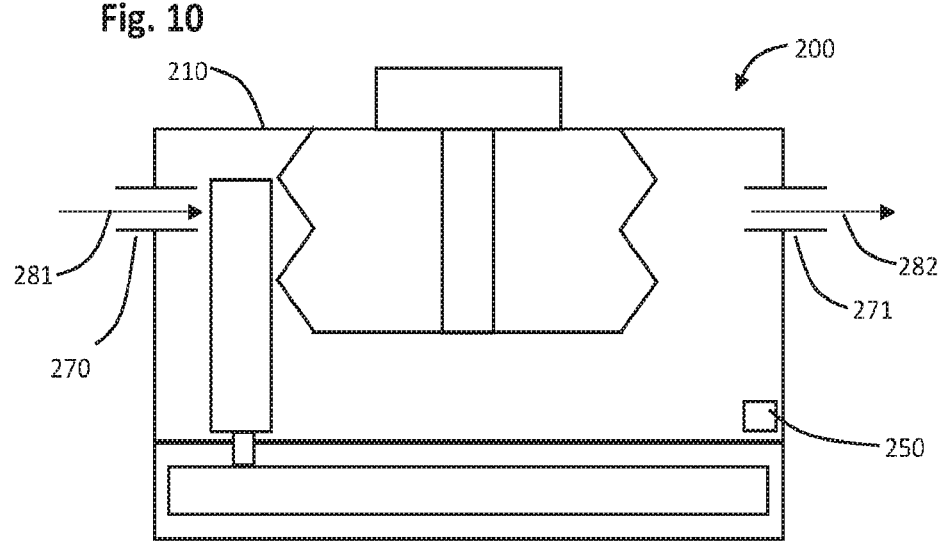

CHANGING THE GAS CONTENT OF A DEVICE

BACKGROUND

Materials used in additive manufacturing may be processed in an atmosphere with particular characteristics in order to provide certain effects. For example, additive manufacturing with some materials may take place in an atmosphere with a low oxygen concentration to avoid unwanted oxidation of the materials.

BRIEF DESCRIPTION OF THE DRAWINGS

Examples are further described hereinafter with reference to the accompanying drawings, in which:

FIGS. 8 to 12 illustrate a further additive manufacturing apparatus according to some examples.

DETAILED DESCRIPTION

Figure 1:
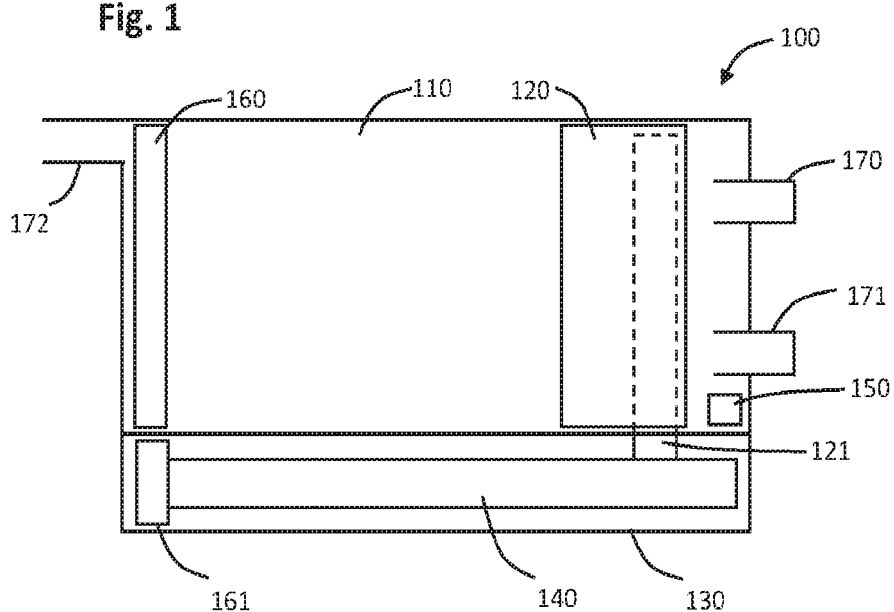
FIGS. 1 to 7 illustrate an additive manufacturing apparatus according to some examples.
Figure 2:
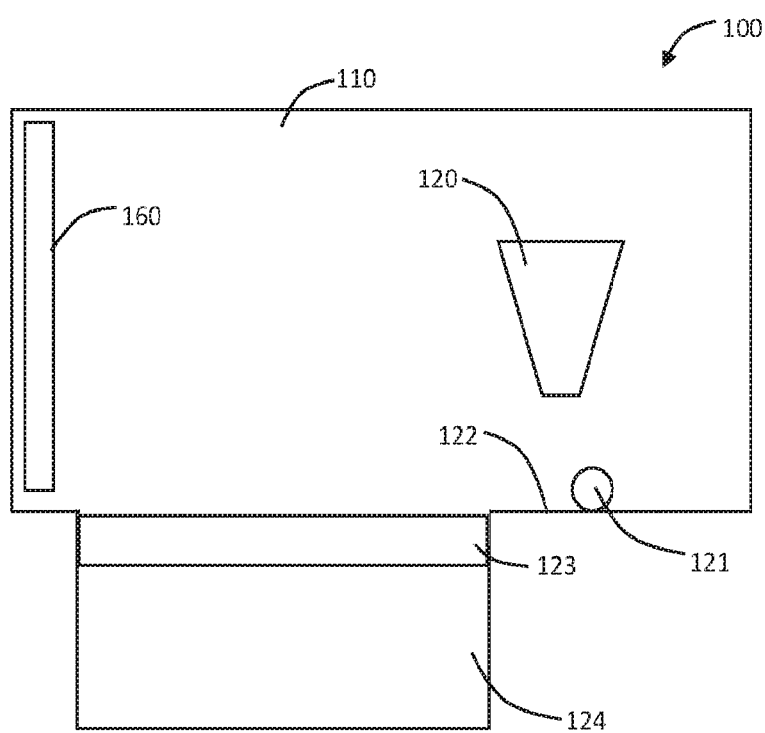

FIG. 1 is a diagram showing a plan-view of an additive manufacturing apparatus 100, also known as a 3D printer. FIG. 2 is a diagram showing a cross-section of the same additive manufacturing apparatus 100. Additive manufacturing comprises creating an object by the progressive addition of parts of the object, for example by selectively adhering a powdered build material.

The additive manufacturing apparatus 100 comprises a manufacturing chamber 110, which contains a build material distributor 120 and a build material spreader 121. Since the build material spreader lies partly beneath the build material distributor 120 in FIG. 1, its position is indicated by a dotted line. During a manufacturing process the build material distributor 120 deposits small quantities of build material onto a floor 122 of the additive manufacturing apparatus 100 so that they can be spread over a platform 123 by the build material spreader 121. The build material on the platform 123 is selectively bonded or fused to create a layer of a desired object, and the platform 123 can then be lowered into a cavity 124 to create space for the next layer of build material. In this way an object can be created in stages.

The additive manufacturing apparatus 100 further comprises axial chamber 130 which contains a rail 140. The build material spreader 121 extends into the axial chamber 130 and is connected to the rail 140, and the build material spreader being arranged to move along the longitudinal axis of the rail 140 in use. The gap which joins the manufacturing chamber 110 to the second chamber 130, through which the connector passes, is kept small in order to help keep build materials away from the rail.

The additive manufacturing apparatus 100 further comprises a first member 160 which is located in the manufacturing chamber 110 and a second member 161 which is located in the axial chamber 140. Both the first member 160 and the second member 161 are connected to the rail 140 so that they are able to move along the longitudinal axis of the rail 140 like the carriage 120.

The additive manufacturing apparatus 100 further comprises an inlet valve 170, an outlet valve 171 and an opening 172. The first additive manufacturing apparatus further comprises an oxygen concentration and pressure sensor 150.

Figure 3:
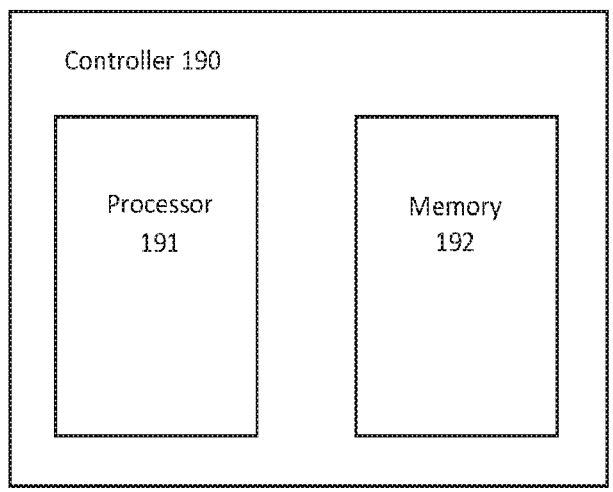

A controller 190 controls the general operation of the additive manufacturing apparatus 100, as described herein. The controller 190 is shown in FIG. 3 and comprises a processor 191 and a memory 192.

Figure 4:
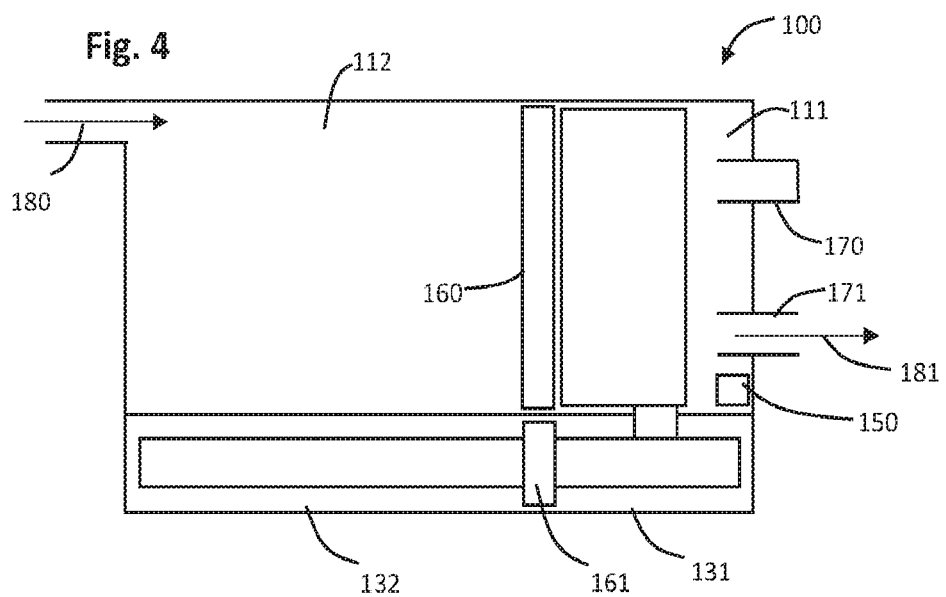

Before the build material can be introduced to the manufacturing chamber 110, the levels of oxygen in the chamber must first be reduced in order to avoid unwanted oxidation during the generation of 3D objects. When the additive manufacturing apparatus 100 is put to use, therefore, the first member 160 is moved so as to divide the manufacturing chamber 110 into a first manufacturing section 111 and a second manufacturing section 112, as is shown in FIG. 4. Similarly, the second member 161 is moved to divide the axial chamber 130 up into a first axial section 131 and a second axial section 132. As such, the additive manufacturing apparatus 100 then comprises a first section 111, 131 and a second section 112, 132, which are divided from one another by the first member 160 and the second member 161. The first member 160 is arranged to closely fit against the walls of the manufacturing chamber 110, and the second member 161 is arranged to closely fit against the walls of the axial chamber 130. In order to minimize gas flow between the first section 111, 131 and the second section 112, 132.

As the first member 160 and the second member 161 move, air is drawn into the second section 112, 132 through the opening 172 as indicated by arrow 180. Also, the outlet 171 is opened so that air in the first section 111, 131 is driven out of the outlet 171 by the movement of the first member 160 end the second member 161 as indicated by arrow 181.

Figure 5:
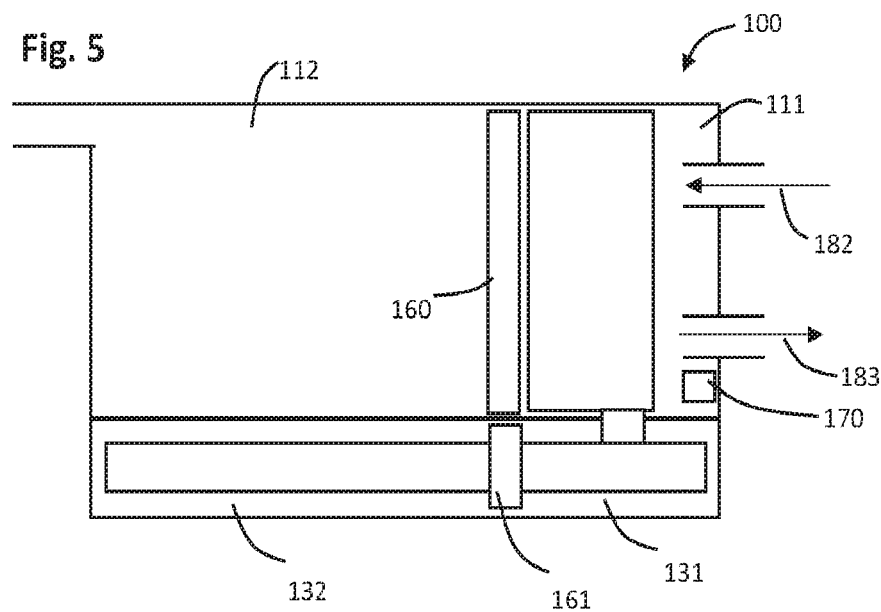
Figure 6:
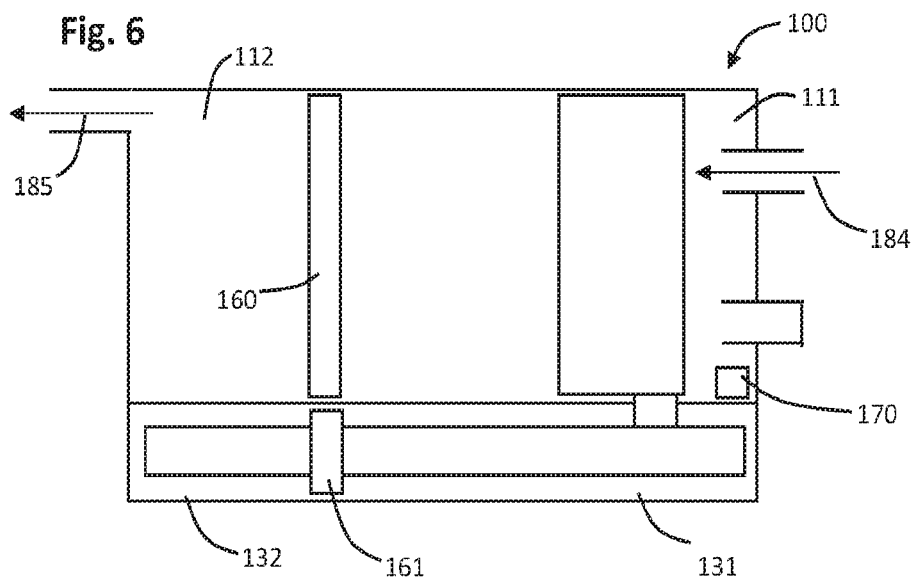

When the first member 180 and the second member 161 have arrived at a position that minimizes the volume of the first section 111, 131, as shown in FIG. 5, the inlet valve 170 is opened up and nitrogen is pumped into the first section through the inlet valve 170 as indicated by arrow 162. Nitrogen is used in the present example, but any gas with desired characteristics may be used as a purging gas, including for example other inert or near-inert gasses. While the nitrogen is pumped in through the inlet valve 170, first air and then a mixture of air and the pumped nitrogen is pushed out of the outlet valve 171 by the increased pressure inside the first section 111, 131 as indicated by arrow 183. As such, the levels of air in the first section 111, 131 are reduced and the levels of nitrogen are continuously increased.

Figure 8:
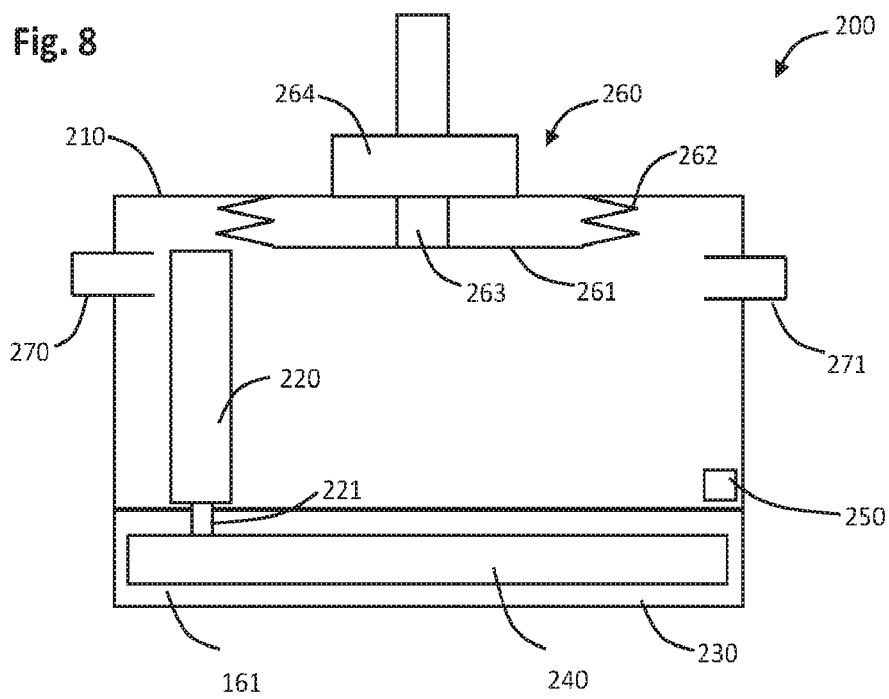
Figure 11:
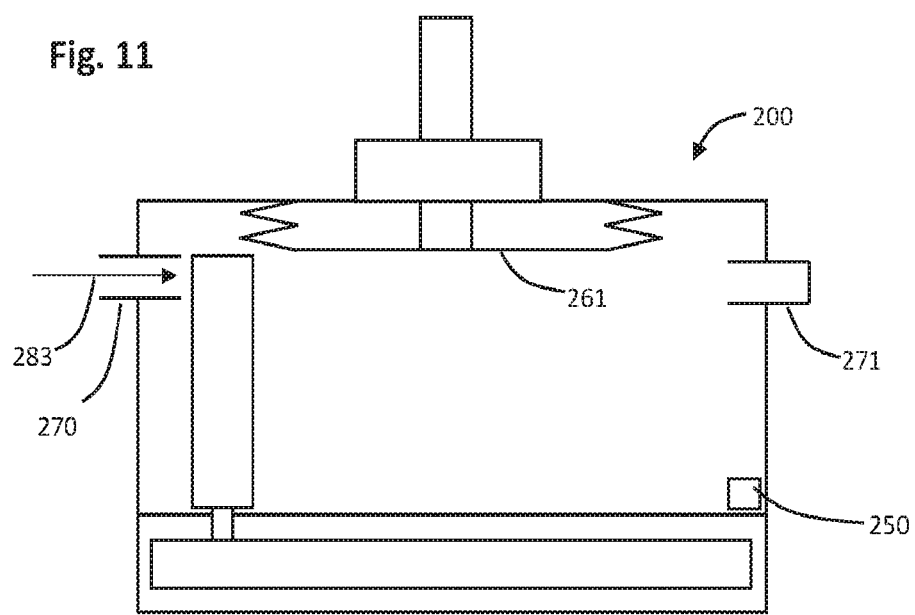
Figure 12:
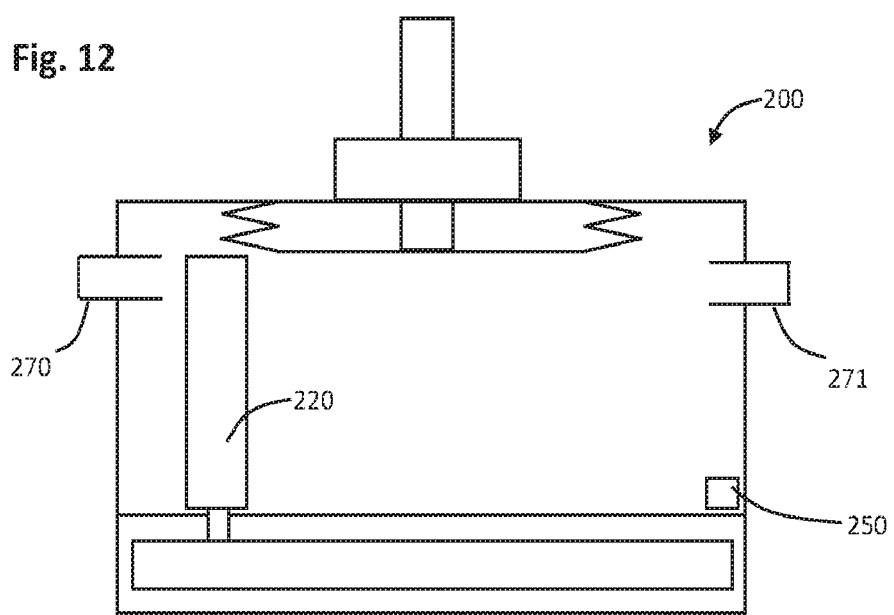

The oxygen concentration and pressure sensor 150 records the oxygen levels in the first section 111, 131. Once a target oxygen concentration in the first section 111, 131 has been reached, the outlet valve 171 is closed and the first member 160 and the second member 161 begin to move back across the manufacturing chamber 110 and the axial chamber 130, respectively, as shown in FIG. 8. This increases the size of the first section 111, 131. While they are moving, pumping of nitrogen through the inlet valve 170 continues, as indicated by arrow 184, so that the pressure inside the first section remains higher that an atmospheric pressure inside the second section 112, 132. Therefore. It there is any gas flow between the sections it will be from the first section 111, 131 to the second section 112, 132, and the lowered oxygen concentration in the first section 111, 131 will be maintained.

Moreover, as the first member 160 and the second member 161 move from right to left as shown in the figures, the oxygen concentration in the first section 111, 131 will be lowered, since the total number of oxygen molecules in the first section 111, 131 will remain constant while the volume of the first section 111, 131 is increased. The relationship between the concentration of oxygen at different stages is governed by equation 1:

$$V_{Final} \cdot C_{OxyFinal} = V_{Reduced} \cdot C_{AfterPurge} + (V_{Final} - V_{Reduced}) \cdot C_{Oxy\ in\ N2}$$
(Equation 1)

Wherein: $V_{Final}$ is the volume of the first section 111, 131 as shown in FIG. 1; $V_{Reduced}$ is the volume of the ft section as shown in FIG. 4; $C_{AfterPurge}$ is the concentration of oxygen achieved by purging the reduced volume; $C_{Oxy\ in\ N2}$ is the concentration of oxygen within the nitrogen fed into the additive manufacturing apparatus 100; and $C_{OxyFinal}$ is the concentration of oxygen at a final expanded state where the additive manufacturing apparatus 100 is ready to build.

Figure 7:
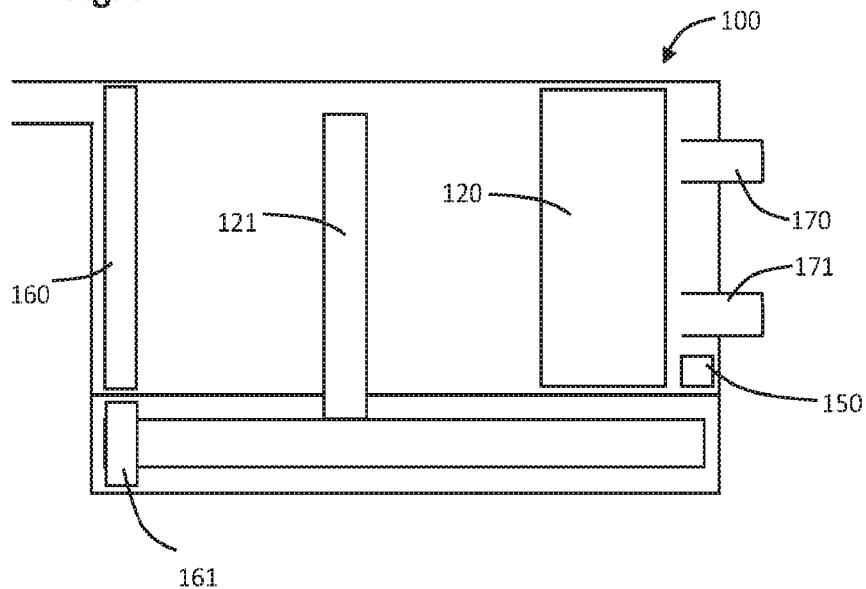

When the first member 160 and the second member 161 teach their starting positions, as shown in FIG. 7, pumping may be ceased and the inlet valve 170 is closed. If the pressure within the first section 111, 131, as detected by the oxygen concentration and pressure sensor 150, falls to be equal to that of the atmospheric pressure, then the inlet valve can be opened again and more nitrogen can be pumped into the first section 111, 131 in order to ensure that oxygen does not begin to leak into the first section 111, 131.

The carriage 120 will then begin operating to begin the process of additive manufacturing as described above. During manufacturing, the lowering of the platform 123 may cause changes in pressure in the first section 111, 131. If this occurs, they will be detected by the oxygen concentration and pressure sensor 150, and more nitrogen can be introduced through the inlet valve 170 as necessary to maintain a desired pressure.

In this way, the oxygen levels in the first section are reduced and levels of a desired replacement such as nitrogen are increased prior to 3D printing operation commencing. Nitrogen purging using a sweep through as described above is governed by equation 2:

$$Q \cdot t = \frac{V}{K} \cdot \ln\left(\frac{C_1 - C_0}{C_2 - C_0}\right) \quad \text{(Equation 2)}$$

Wherein: Q is volumetric flow rate of nitrogen; t is the time taken for the purge; V is volume to be purged which in this case is the volume of the first section 111, 131; K is a correction factor for the assumption of perfect mixing; $C_0$ is the oxygen concentration of the nitrogen gas: $C_1$ is the initial oxygen concentration in the first section 111, 131; and $C_2$ is the target oxygen concentration for the first section 111, 131. As can be seen from this equation, the volume of nitrogen used to purge to a given concentration is directly proportional to the internal volume of the chamber which contains the gas which is to be purged. Therefore, if the volume of the first section 111, 131 is reduced, then the consumption of nitrogen is reduced by the same proportion. The time t is also reduced if the volumetric flow rate Q is kept constant.

The volume of the manufacturing chamber 110 can be arbitrarily large, allowing the manufacture of large objects, allowing free movement of components such as the build material spreader 121 during use, and allowing easy access for maintenance. However, the size of the first section 111, 131 when it is purged is kept small, allowing the purging to occur quickly and to use a minimal amount of nitrogen.

In a further example, the first member 160 and the second member 161 may be arranged to provide a complete seal with the walls of the manufacturing chamber 110 and the axial chamber 130. In such an example the pressure of gas in the first section 111, 131 may be allowed to drop without risking oxygen leaking in.

In a further example, the axial chamber 130 may be provided with a second inlet valve and a second outlet valve, the second inlet valve being arranged to provide nitrogen to the first axial section 131 and the second outlet valve being arranged to allow air out of the first axial section 131 in a similar manner to the inlet valve 170 and the outlet valve 171. This may help to lower the oxygen levels in the second section more efficiently.

In a further example, the axial chamber 130 may be sealed from the manufacturing chamber 110 such that there is no significant exchange of gasses between the axial chamber 130 and the manufacturing chamber 110. In such an example, the oxygen level of the axial chamber may not need to be altered, and the axial chamber 130 may not be provided with a second member 161.

In a further example, the carriage 220 may comprises the first member 160, the second member 161, or both the first member 160 and the second member 161.

A further example may not comprise an outlet 171. Instead, when nitrogen is pumped through the inlet valve 170, air may flow around the first member 160 and the second member 161 and out through the opening 172.

FIG. 8 shows a plan-view of an additive manufacturing apparatus 200 according to a further example. The additive manufacturing apparatus 200 comprises a manufacturing chamber 210, a build material distributor 220, a build material spread 221, an axial chamber 230, a rail 240, an oxygen concentration and pressure sensor 250, an inlet valve 270 and an outlet valve 271. Although not shown in the plan-view, the additive manufacturing apparatus 200 also comprises a platform which can descend into a cavity arranged in its floor. In use, each of these components performs a similar function to their equivalents in the additive manufacturing machine 100.

The additive manufacturing apparatus 200 further comprises a bellows assembly 260. The bellows assembly 260 comprises: a face plate 261: a concertina bag 262 which joins the face plate 261 to a wall of the manufacturing chamber 210: a rod 263 which is attached to the face plate 261: and a motor 264 which is arranged to drive the rod 263. The face plate 261 and the concertina bag 262 form a seal such that gas within the manufacturing chamber 210 and the axial chamber 230 is kept separate from gas contained by the face plate 261 and the concertina bag 262.

When the additive manufacturing apparatus 200 is put to use, the outlet valve 271 is opened and the motor 264 is used to drive the rod 263 into the manufacturing chamber 210 as is shown in FIG. 7. This forces some of the air in the manufacturing chamber 210 out of the outlet valve 271 as indicated by arrow 280. Air is also allowed to flow into the bellows from outside the machine to fill the expanding volume there.

When the bellows assembly is fully expanded as shown in FIG. 8, the inlet valve 270 is opened and nitrogen, or some other desired gas, is pumped into the manufacturing chamber 210 as indicated by arrow 261. In response to the increase in pressure this causes, first air, and a mixture of air and the nitrogen to therefore flow out of the outlet valve 271 as indicated by the arrow 282.

Once a target oxygen concentration in the manufacturing chamber 210 and the axial chamber 230 has been reached, the outlet valve 271 is closed and the motor 264 is used to drive the rod 263 again, moving the face plate 261 back towards the wall of the manufacturing chamber 210 as shown in FIG. 9. This increases the internal volume of the manufacturing chamber 210. While the face plate 281 is moving, pumping of nitrogen through the inlet valve 270 continues, as indicated by arrow 283, so that the pressure inside the manufacturing chamber 210 and the axial chamber 230 is maintained. Air within the bellows assembly is forced back out of the additive manufacturing apparatus 200 through the motor 264.

When the bellows assembly 260 is fully retracted as shown in FIG. 10, pumping may be ceased and the inlet valve 270 is closed. If the pressure within the manufacturing chamber 210 and the axial chamber 230 falls such that there is a chance of oxygen entering, then the inlet valve can be opened again and more nitrogen can be pumped into the manufacturing chamber 210 and the axial chamber 230 to prevent this.

The additive manufacturing apparatus 200 will then begin operating to begin the process of additive manufacturing.

In a further example, the bellows assembly may be supplemented by or replaced with further bellows assemblies located on other parts of the interior surface of the manufacturing chamber 210 or the axial chamber 230. The face plate 261 may be deformable. The bellows assemblies may also be replaced in whole or in part with an inflatable bag or bags, the inflatable bags being inflated by being filled with air or some other gas to reduce the internal volume of the chamber. Members such as the members 160, 161 in the additive manufacturing apparatus 100 could also have their effect supplemented by a bellows assembly or inflatable bags.

The example additive manufacturing apparatuses described herein may use a sweep through method to purge oxygen and increase levels of nitrogen once a decreased internal volume has been achieved, but various other purging methods can be used.

For example, a pump may be arranged to pump air out of the manufacturing chamber 110, 210 through the outlet valve 171, 271, reducing the internal pressure, before the chamber is filled with nitrogen or some other desired gas through the inlet valve 170, 270. This can be repeated until the desired concentrations are achieved.

Alternatively, the outlet valve 171, 271 can be kept closed while purging gas is pumped through the inlet valve 170, 270, thereby increasing the internal pressure and allowing further mixing of the air with the gas, before the outlet valve 171, 271 is opened to allow the pressurized air and purging gas to escape. This can be repeated until the desired concentrations are achieved.

In some examples, an additive manufacturing apparatus may comprise a removable device, the device comprising at least the first chamber. In this way, the first chamber may be removed and provided, for example, with a low oxygen environment while separated from the additive manufacturing apparatus. The device may then be fitted back into the additive manufacturing apparatus for use.

Throughout the description and claims of this specification, the words "comprise" and "contain" and variations of them mean "including but not limited to", and they are not intended to (and do not) exclude other components, integer or operations. Throughout the description and claims of this specification, the singular encompasses the plural unless the context demands otherwise. In particular, where the indefinite article is used, the specification is to be understood as contemplating plurality as wed as singularity, unless the context demands otherwise.

Features, integers or characteristics described in conjunction with a particular aspect or example are to be understood to be applicable to any other aspect or example described herein unless incompatible therewith. All of the features disclosed in this specification (including any accompanying claims, abstract and drawings), and/or al of the elements of any method or process so disclosed, may be combined in any combination, except combinations where at least some of such features and/or operations are mutually exclusive. Implementations are not restricted to the details of any foregoing examples.

The invention claimed is:

1. A method for changing the gas content of a device which comprises a first chamber, the method comprising:
    arranging the device in a first configuration, wherein:
        during arrangement of the device into the first configuration:
            a first gas is driven out of the first chamber;
            the first gas is drawn into a second chamber adjacent the first chamber; and
        the first chamber has a first internal volume;
    providing a flow of a second gas to the first chamber so that the gas content of the first chamber is at least partially changed;
    transitioning the device from the first configuration to a second configuration, wherein the first chamber has a second internal volume which is greater than the first internal volume; and
    during transitioning the device from the first configuration to the second configuration, driving the first gas from the second chamber;
        wherein the flow of the second gas to the chamber is maintained while the device transitions from the first configuration to the second configuration.

2. A method according to claim 1, wherein the method further comprises performing additive manufacturing in the first chamber after the device has transitioned to the second configuration.

3. A method according to claim 1, wherein the device comprises at least one first member which is located within the first chamber such that the inner surfaces of the chamber comprise at least one surface of the first member, and wherein transitioning the device from the first configuration to the second configuration comprises moving the first member across the chamber perpendicular to a lowering movement of a platform within the first chamber.

4. A method according to claim 3, wherein at least one first member forms an airtight seal with at least one inner surface of the first chamber.

5. A method according to claim 4, wherein transitioning the device from the first configuration to the second configuration comprises pumping a second gas which may be different to the first gas into a space behind the first member.

6. A method according to claim 4, wherein the first member is deformable.

7. A method according to claim 3, wherein at least one first member is joined to at least one inner surface of the first chamber by a flexible member.

8. A method according to claim 3, wherein transitioning the device from the first configuration to the second configuration comprises driving a motor which moves the first member.

9. A method according to claim 1, wherein the first second gas is nitrogen.

10. The method of claim 1:
    further comprising detecting a concentration of the first gas while in the first configuration; and
    wherein transitioning the device from the first configuration to the second configuration is responsive to the concentration of the first gas falling below a target value.

11. The method of claim 10, further comprising, responsive to the concentration of the first gas falling below a target value, closing a valve through which the first gas is driven out.

12. The method of claim 1, wherein:
- arranging the device in the first configuration comprises expanding a bellows assembly; and
- transitioning the device from the first configuration to the second configuration comprises drawing air out of the bellows assembly.

* * * * *